(12) United States Patent
Chung et al.

(10) Patent No.: US 9,066,198 B2
(45) Date of Patent: Jun. 23, 2015

(54) INTEGRATED CONTACTLESS SIGNAL TRANSFER APPARATUS

(71) Applicant: National Chiao Tung University, Hsinchu (TW)

(72) Inventors: Shyh-Jong Chung, Hsinchu County (TW); Hsiao-Ning Wang, Taoyuan County (TW)

(73) Assignee: NATIONAL CHIAO TUNG UNIVERSITY, Hsinchu (TW)

( * ) Notice: Subject to any disclaimer, the term of this patent is extended or adjusted under 35 U.S.C. 154(b) by 70 days.

(21) Appl. No.: 14/093,309

(22) Filed: Nov. 29, 2013

(65) Prior Publication Data
US 2015/0111492 A1    Apr. 23, 2015

(30) Foreign Application Priority Data

Oct. 17, 2013  (TW) .............................. 102137451 A (51) Int. Cl.
*H04B 5/00* (2006.01)
*H04W 4/00* (2009.01)

(52) U.S. Cl.
CPC ............. *H04W 4/008* (2013.01); *H04B 5/0031* (2013.01)

(58) Field of Classification Search
CPC ....................... G06K 7/10178; G06K 7/10336
See application file for complete search history.

(56) References Cited

U.S. PATENT DOCUMENTS

| | | | |
|---|---|---|---|
| 6,952,560 B2 * | 10/2005 | Feibig et al. | 455/41.1 |
| 2005/0110641 A1 * | 5/2005 | Mendolia et al. | 340/572.7 |
| 2011/0021139 A1 * | 1/2011 | Montgomery et al. | 455/41.1 |
| 2012/0309308 A1 * | 12/2012 | Kim et al. | 455/41.1 |
| 2013/0178158 A1 * | 7/2013 | Mickle et al. | 455/41.1 |
| 2013/0244577 A1 * | 9/2013 | Cheikh | 455/41.1 |
| 2014/0011452 A1 * | 1/2014 | Ji et al. | 455/41.1 |

* cited by examiner

*Primary Examiner* — David Bilodeau
(74) *Attorney, Agent, or Firm* — Muncy, Geissler, Olds & Lowe, P.C.

(57) ABSTRACT

An integrated contactless signal transfer apparatus makes use of the rule of filter design to transfer signal from a chip to the transmission lines of a PCB. The integrated contactless signal transfer apparatus includes a substrate, a chip disposed on the substrate, a first resonator unit disposed on the chip for receiving a first signal with a first frequency generated from the chip, a PCB positioned at a distance opposite to the substrate, and a second resonator unit disposed on the PCB. The first signal passes through the first resonator unit to generate a contactless coupling between the first and second resonator units, so the second resonator unit generates a second signal. The second signal has a second frequency substantially equal to the first frequency.

14 Claims, 6 Drawing Sheets

INTEGRATED CONTACTLESS SIGNAL TRANSFER APPARATUS

BACKGROUND OF THE INVENTION

1. Field of the Invention

The present invention relates to an integrated contactless signal transfer apparatus, and, more particularly, to an integrated contactless signal transfer apparatus suitable for a signal transfer without a direct contact.

2. Description of Related Art

In recent years, with the advance and application of millimeter wave, the high-speed transfer application of wireless personal area networks (WPANs) and the in-car radar system are developed toward a band of few tens of GHz or even a band of THz. A wireless communication system operated in a millimeter wave band can transfer a large amount of data, and this is advantageous in a short-distance WPAN application or short-, middle-, and long-distance car radar systems. All systems on developing millimeter wave circuit technologies are towards a chip-based design for circuit area reduction and mass production, thereby reducing the cost. Generally, the circuit architecture of a transceiver includes a receiver and a transmitter, or a transceiver circuit, which currently is a chip-based circuit. The chip-based circuit is connected with a next-stage circuit through a transmission line for signal transfers. Typically, such a physical connection is a connection through wire bond or flip chip.

When a transceiver chip is used for a wireless receiving or transmitting communication, it is necessary to use a printed circuit board (PCB) as a carrier for integrating the transceiver with other chips or circuits, such as a power supply, digital circuit, baseband circuit, memory circuit, antenna, and the like, so as to complete the whole system operation. When the transceiver is not a single chip, the LNA chip, PA chip and VCO chip have to be connected with the transmission lines of a PCB through the wire bond or flip chip connection. However, when a system is operated in a high-frequency band such as a millimeter wave band, the wire bond or flip chip connection may generate a parasitic effect resulting in negatively affecting the system performance. In addition, the package cost is increased as a relatively high accuracy for the wire bond or flip chip connection is required.

Therefore, it is desirable to provide an integrated contactless signal transfer apparatus, which can mitigate and/or obviate the aforementioned problems.

SUMMARY OF THE INVENTION

The object of the present invention is to provide an integrated contactless signal transfer apparatus, which makes use of the rule of filter designs to eliminate the parasitic affect caused by the wire bond or flip chip connection so as to effectively transfer signal from a chip to the transmission lines of a PCB.

To achieve the object, an integrated contactless signal transfer apparatus is provided, which includes a substrate having a first surface; a chip disposed on the first surface; a first resonator unit disposed on the chip for receiving a first signal with a first frequency generated from the chip; a printed circuit board (PCB) having a second surface opposite to the substrate and disposed to have a gap between the substrate and the PCB, wherein the gap is a distance from the first surface to the second surface; and a second resonator unit disposed on the second surface, wherein the first signal with the first frequency passes through the first resonator unit to generate a contactless coupling between the first resonator unit and second resonator unit, so that the first signal is transferred between the first resonator unit and second resonator unit in a manner of electromagnetic coupling transmission.

Therefore, the integrated contactless signal transfer apparatus of the invention makes use of the rule of filter design to eliminate the parasitic affect caused by the wire bond or flip chip connection, so as to reduce the cost and transfer signal from chip to the PCB in low loss.

Further, for increasing the coupling amount between the first and the second resonator units in the invention, the ground of the first resonator on the chip can be excavated to reduce the capacitance effect between the first resonator unit and the ground thereby increasing the magnetic coupling amount between the first resonator unit and the second resonator unit, Such a way can be applied in the corresponding processes of various chips, such as the CMOS process in the invention.

In the integrated contactless signal transfer apparatus of the invention, the distance ranges between zero and 200 µm. Thus, the contactless coupling in the distance can be effectively transferred between the first and the second resonator units. Particularly, the distance preferably ranges between zero and 30 µm.

In the integrated contactless signal transfer apparatus of the invention, each of the first and the second resonator units can be a distributed element, a semi-distributed element, or a lumped element. Preferably, the first and the second resonator units are each the distributed element.

In the integrated contactless signal transfer apparatus of the invention, the chip includes a signal feed-in unit connected to the first resonator unit so as to feed the first signal through the signal feed-in unit to the first resonator unit.

In the integrated contactless signal transfer apparatus in the invention, the chip further includes a grounding unit between the first resonator unit and the substrate.

In the integrated contactless signal transfer apparatus of the invention, the substrate is a silicon substrate. Alternatively, the substrate us a GaAs substrate. When the silicon substrate, preferably with a low resistance, is used, an etching is made in the backend process to thereby decrease the energy loss and effectively reduce the cost as compared with the expensive GaAs substrate or high impedance silicon substrate.

In the integrated contactless signal transfer apparatus of the invention, the first signal has a first wavelength, and the first resonator unit has a first resonant path with a length about a ¼, ½, or integer multiple of the first wavelength.

In addition, the second resonator unit generates a second signal with a second wavelength, and the second resonator unit has a second resonant path with a length about a ¼, ½, or integer multiple of the second wavelength.

In the integrated contactless signal transfer apparatus in the invention, the second resonator unit has a U shape, and preferably it is a U-shaped half wave resonator unit in order to reduce the area and provide the effective coupling amount.

In the integrated contactless signal transfer apparatus of the invention, the contactless coupling is a near-field coupling. The near field coupling can be an inductive, capacitive, or mixed coupling.

In the integrated contactless signal transfer apparatus of the invention, the second resonator unit includes a plurality of resonators, so that the first resonator unit has a one-to-multiple signal transfer corresponding to a plurality of resonators respectively.

DETAILED DESCRIPTION OF THE PREFERRED EMBODIMENT

Figure 1:
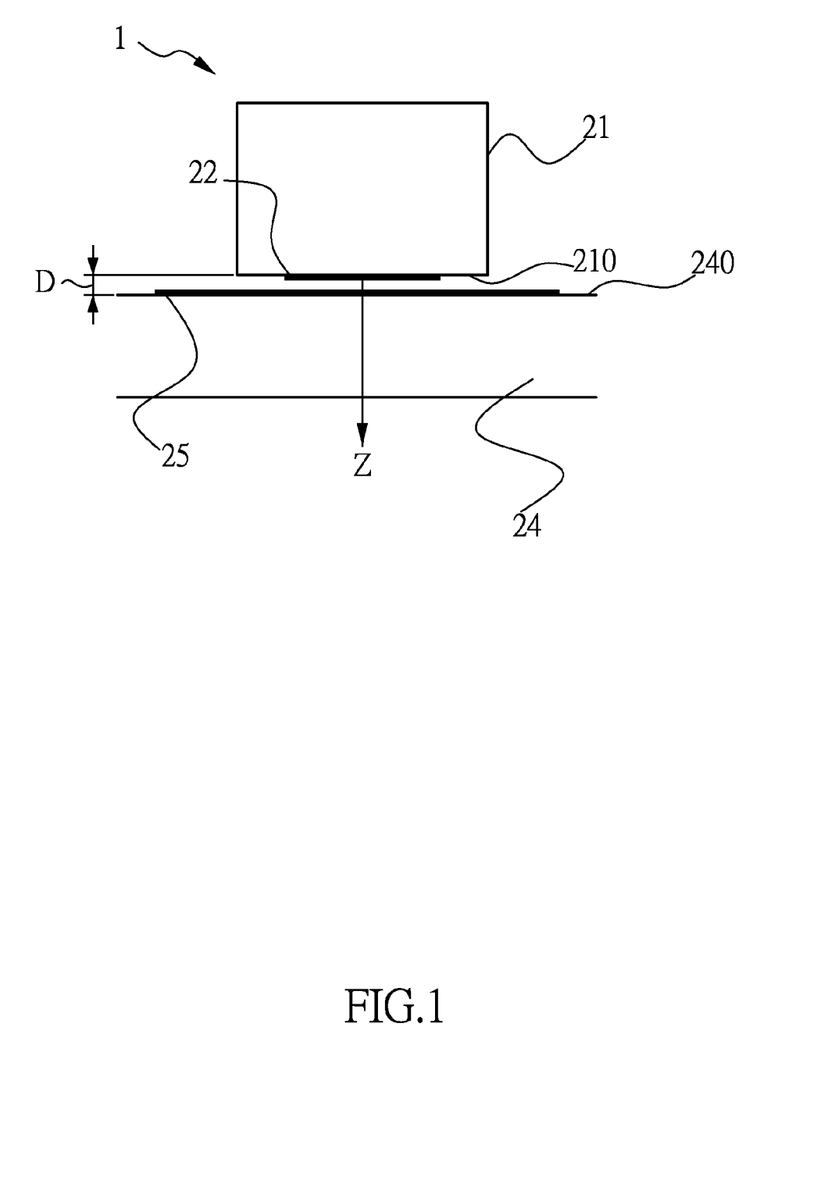
FIG. 1 is a schematic view of an integrated contactless signal transfer apparatus according to a preferred embodiment of the invention.
Figure 2:
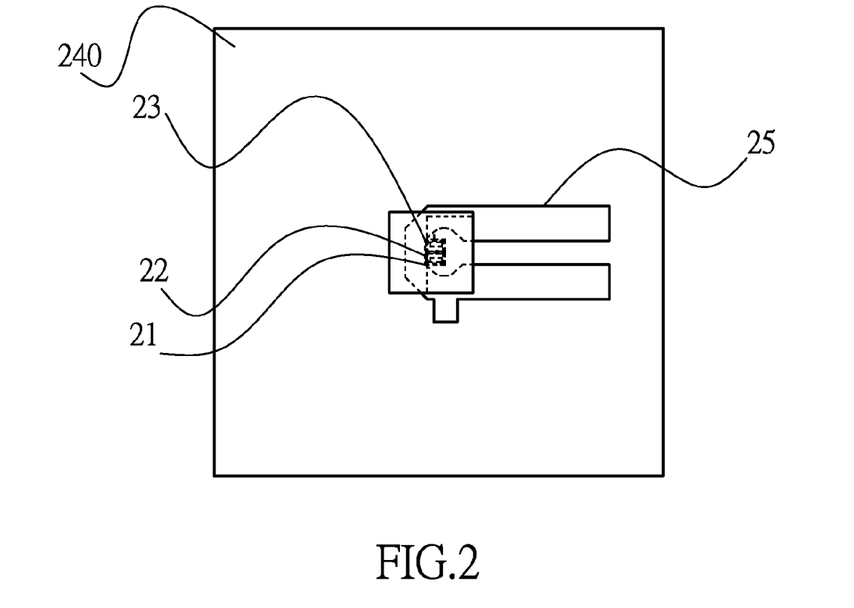
FIG. 2 is a top view of an integrated contactless signal transfer apparatus according to a preferred embodiment of the invention.

FIG. 1 is a schematic diagram of an integrated contactless signal transfer apparatus according to a preferred embodiment of the invention, and FIG. 2 is a top view of an integrated contactless signal transfer apparatus according to a preferred embodiment of the invention. With reference to FIG. 1 (along a Z axis) and FIG. 2, the integrated contactless signal transfer apparatus 1 includes a substrate 21, a chip 22, a first resonator unit 23, a PCB 24, and a second resonator unit 25. The substrate 21 has a first surface 210. The chip 22 is disposed on the first surface 210. The first resonator unit 23 is disposed on the chip 22 to receive a first signal (not shown) with a first frequency generated from the chip 22. The PCB 24 has a second surface opposite to the first surface 210 and is disposed to have a gap D between the substrate 21 and the PCB. Namely, the gap D is a distance from the first surface 210 to the second surface 240. Thus, the PCB 24 is kept to have no physical touch with the substrate 21, and D is 30 μm in this embodiment. The second resonator unit 25 is disposed on the second surface 240. The first signal with the first frequency passes through the first resonator unit 23, so as to generate a contactless coupling between the first resonator unit 23 and the second resonator unit 25. Therefore, with electromagnetic coupling transfer manner, the first signal 21 can be effectively transferred between the first resonator unit 23 and the second resonator unit 25. Further, the second resonator unit 25 correspondingly generates a second signal (not shown) with a second frequency. The first frequency is substantially equal to the second frequency.

Therefore, the integrated contactless signal transfer apparatus of the invention makes use of the rule of filter design to provide a contactless transfer structure design for eliminating the parasitic affect caused by the wire bond or flip chip connection so as to effectively transfer signal from the chip to the PCB.

In this embodiment, each of the first resonator unit 23 and the second resonator unit 25 can be a distributed element, a semi-distributed element, or a lumped element. In this embodiment, the first resonator unit 23 and the second resonator unit 25 are each a distributed element.

In addition, for increasing the coupling amount between the first resonator unit 23 and the second resonator unit 25, the ground of the first resonator 23 on the chip can be excavated to reduce the capacitance effect between the first resonator unit 23 and the ground thereby increasing the magnetic coupling amount between the first resonator unit 23 and the second resonator unit 25. Such a way can be applied in the corresponding processes of various chips, such as the CMOS process in this embodiment.

Figure 3:
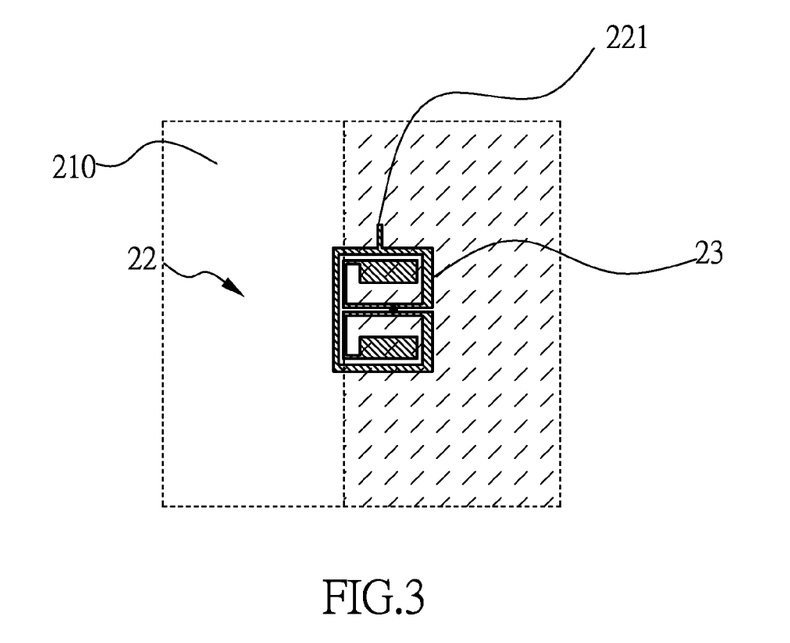
FIG. 3 is a top view of a first resonator unit disposed on a chip according to a preferred embodiment of the invention.

More specifically, as shown in FIG. 2, in this embodiment, the second resonator unit 25 is designed to have a U shape. In addition, also with reference to FIG. 3, there is shown a top view of the first resonator unit 23 disposed on the chip 22 according to a preferred embodiment of the invention. As shown in FIG. 3, the chip 22 further includes a signal feed-in unit 221 connected to the first resonator unit 23, so that the first signal (not shown) can be fed from the signal feed unit 221 into the first resonator unit 23. The second resonator unit 25 is designed to have a U shape corresponding to a hairpin-like resonator structure of the first resonator unit 23. The first resonator unit 23 and the second resonator unit 25 are each a ½ wavelength resonator, and designed as a single layer of flat sheet. The first signal has the first frequency with a first wavelength. The first resonator unit 23 has a first resonant path corresponding to the first wavelength of the first signal. Thus, the length of the first resonant path is about a ½ or integer multiple of the first wavelength. Similarly, the second resonator unit 25 has a second resonant path corresponding to the second wavelength of the second signal via contactless coupling by using the rule of filter design. Thus, the length of the second resonant path is about a ½ or integer multiple of the second wavelength. For the resonant paths of the resonator units 23 and 25, the cited resonator structure is not intended to limit the lengths of the resonant paths, and it is applicable to design the proportion of the signal wavelengths for the resonator units corresponding to different resonator structures. Generally, the length of a resonant path is about a ¼, ½, or integer multiple of the second wavelength.

Figure 4:
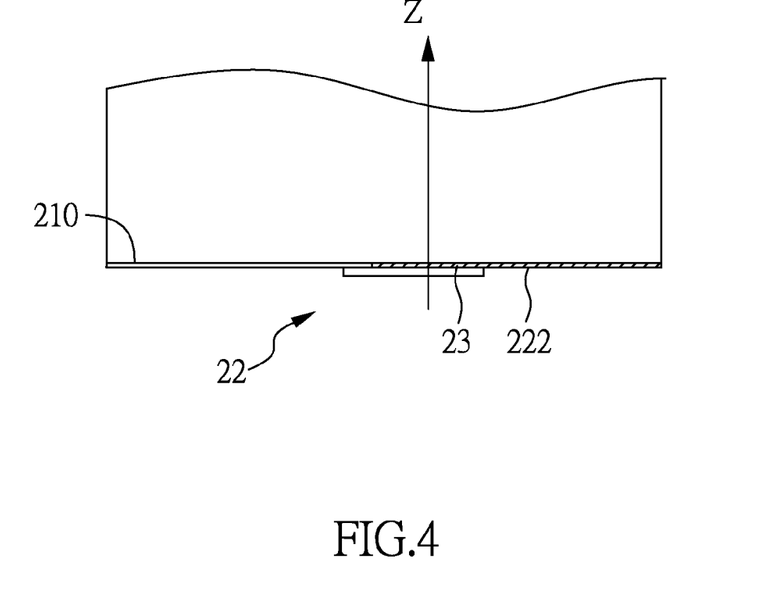
FIG. 4 is a cross sectional view of a first resonator unit disposed on a chip according to a preferred embodiment of the invention.

FIG. 4 is a cross sectional view of the first resonator unit 23 disposed on the chip 22 according to a preferred embodiment of the invention. As shown in FIGS. 3 and 4, the chip 22 further includes a grounding unit 222, which is held between the resonator unit 23 and the first surface 210 of the substrate 21. In this embodiment, the substrate 21 is a silicon substrate, and the chip 22 is a multi-layer structure having a total area of $(350\ \mu m)^2$ on the substrate 21. In addition, when the chip 22 is a multi-layer structure, the first resonator unit 23 can be designed as a flat multi-layer structure, such that the resonant path for the first resonator unit 23 can be designed as a curve on the limited area to thereby gain the multi-layer design and sufficiently use the effective area to save the cost.

In this embodiment, the PCB 24 uses Rogers® 5880, with a thickness of 127 μm, a dielectric constant of 2.2 Fara/m, and a loss tangent of 0.0009.

In this embodiment, each of the first resonator unit 23 and the second resonator unit 25 has its size based on the dielectric constant of the material itself, and thus those skilled in the art can determine the sizes of the first resonator unit 23 and the second resonator unit 25 respectively based on the dielectric constants of the substrate 21 and the PCB 24 together with the first frequency of the first signal and the second frequency of the second signal.

Figure 5:
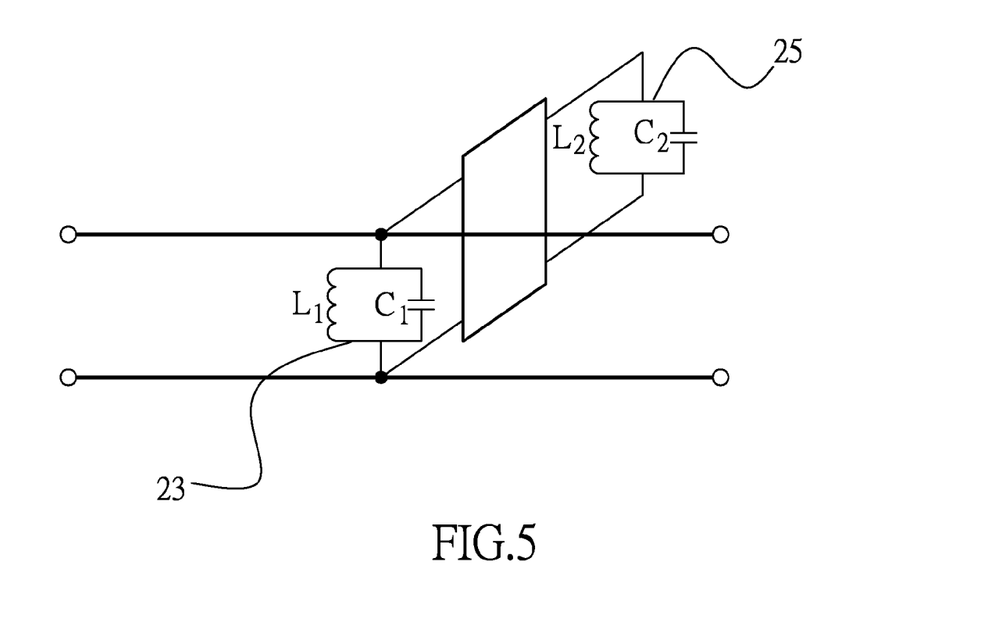
FIG. 5 schematically illustrates an equivalent resonant circuit of first and second resonator units according to a preferred embodiment of the invention.

FIG. 5 schematically illustrates an equivalent resonant circuit of the first and second resonator units 23, 25 according to a preferred embodiment of the invention. As shown in FIGS. 1, 2, and 5, the first signal with the first frequency generated by the first resonator unit 23 and the second resonator unit 25 passes through the first resonator unit 23 to thereby generate a contactless coupling between the first resonator unit 23 and the second resonator unit 25. Further, by using the rule of filter design, the second resonator unit 25 generates a second signal with a second frequency, wherein the first frequency is substantially equal to the second frequency. In view of electronic circuits, the first resonator unit 23 on the chip 21 and the second resonator unit 25 on the PCB 24 can actually be equivalent to an LC resonant circuit, and the contactless coupling in this embodiment is a near-field coupling, while the near-field coupling is an inductive coupling. Therefore, as shown in FIG. 5, the first resonator unit 23 and the second resonator unit 25 in this embodiment can be equivalent to a parallel-connected LC resonant circuit, and the best resonant state is: the inductance-capacitance (L1C1) of the first resonator unit 23 is equal to the inductance-capacitance (L2C2) of the second resonator unit 25, such that the rule of filter design is effectively used to transfer signals between the first resonator unit 23 and the second resonator unit 25.

Figure 6:
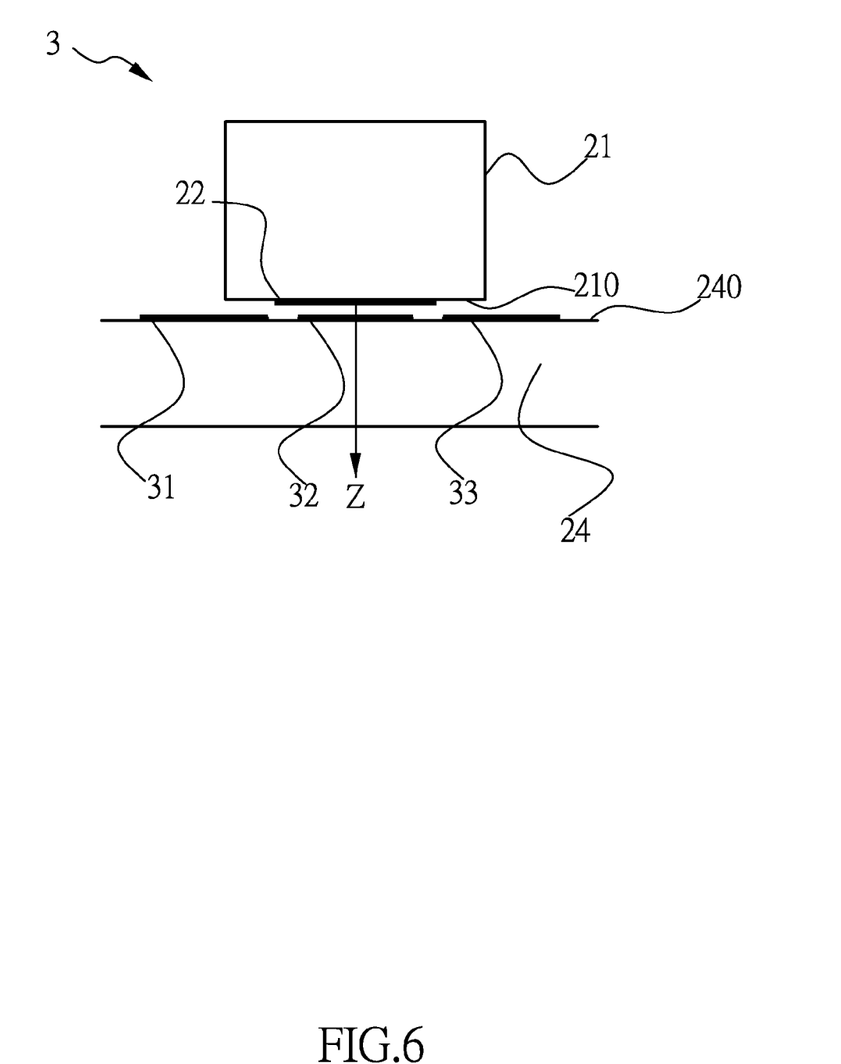
FIG. 6 is a schematic view of an integrated contactless signal transfer apparatus according to another preferred embodiment of the invention.

In addition, the invention can be implemented by using the concept of multi-stage filter, such that, in addition to a one-to-one signal transfer, a one-to-multiple signal transfer can be done between the two resonator units. With reference to FIG. 6, there is shown a schematic diagram of an integrated contactless signal transfer apparatus according to another preferred embodiment of the invention. As shown in FIG. 6, the integrated contactless signal transfer apparatus 3 is the same as that of FIG. 1, except that the second surface 240 of the PCB 24 is disposed with a third resonator unit 31, a fourth resonator unit 32, and a fifth resonator unit 33. The first signal with the first frequency passes through the first resonator unit 23, such that, with the rule of filter design, the first resonator unit 23 generates a contactless coupling with the third resonator unit 31, the fourth resonator unit 32, and the fifth resonator unit 33, respectively. Furthermore, upon the contactless coupling, the third resonator unit 31 generates a third signal with a third frequency substantially equal to the first frequency, the fourth resonator unit 32 generates a fourth signal with a fourth frequency substantially equal to the first frequency, and the fifth resonator unit 33 generates a fifth signal with a fifth frequency substantially equal to the first frequency. Thus, in this embodiment, a one-to-multiple signal transfer is provided.

Figure 7:
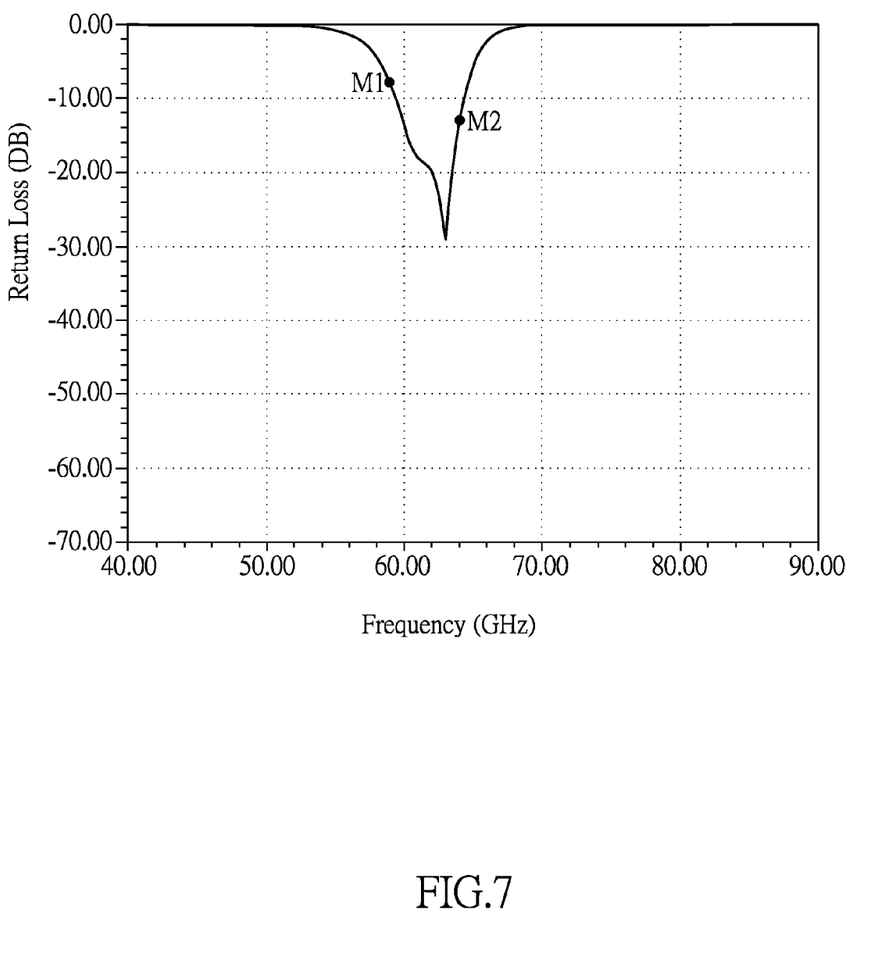
FIG. 7 is a schematic graph of frequency versus return loss for an integrated contactless signal transfer apparatus capable of transmitting or receiving a high frequency signal according to a preferred embodiment of the invention, which obtained by an electromagnetic simulation software.
Figure 8:
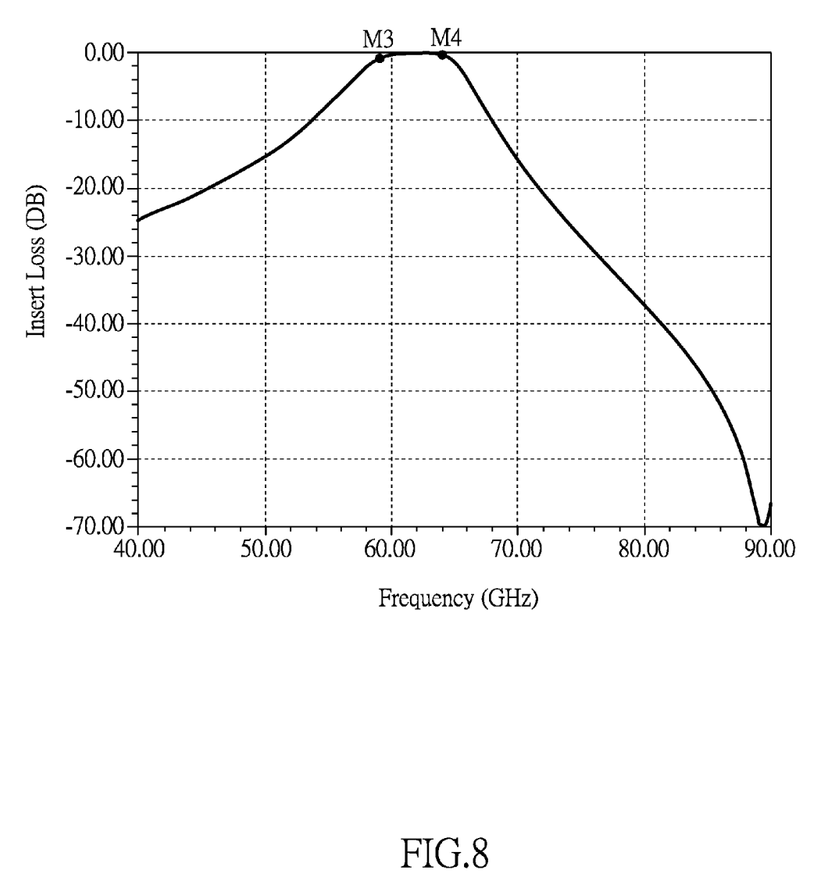
FIG. 8 is a schematic graph of frequency versus insert loss for an integrated contactless signal transfer apparatus capable of transmitting or receiving a high frequency signal according to a preferred embodiment of the invention, which is obtained by an electromagnetic simulation software.

FIG. 7 is a schematic graph of frequency versus return loss for an integrated contactless signal transfer apparatus capable of transmitting or receiving a high frequency signal according to a preferred embodiment of the invention, which is obtained by an electromagnetic simulation software, and FIG. 8 is a schematic graph of frequency versus insert loss for an integrated contactless signal transfer apparatus capable of transmitting or receiving a high frequency signal according to a preferred embodiment of the invention, which is obtained by an electromagnetic simulation software. As shown in FIG. 7, in this embodiment, by using the ANSOFT HFSS® commercial software to perform the return loss simulation and analysis on high frequency structure, it is known that the bandwidth of a return loss of −10 dB is in the range of 59 GHz to 64 GHz i.e., between the points M1 and M2). In addition, as shown in FIG. 8, in this embodiment, by using the ANSOFT HFSS® commercial software to perform the return loss simulation and analysis on high frequency structure, it is known that the insert loss in this bandwidth range is lower than 0.2 dB. Therefore, the inventive apparatus can make use of the rule of filter design for the 60 GHz consumer electronic band, but not limited to this frequency band. The invention can further design the size of each element or component in the apparatus for the required frequency band, which can be widely applied in various integrated chips and PCB signal transfer applications.

Although the present invention has been explained in relation to its preferred embodiment, it is to be understood that many other possible modifications and variations can be made without departing from the spirit and scope of the invention as hereinafter claimed.

What is claimed is:

1. An integrated contactless signal transfer apparatus, comprising:
    a substrate having a first surface;
    a chip disposed on the first surface;
    a first resonator unit disposed on the chip for receiving a first signal with a first frequency generated from the chip;
    a printed circuit board (PCB) having a second surface opposite to the substrate and disposed to have a gap between the substrate and the PCB, wherein the gap is a distance from the first surface to the second surface; and
    a second resonator unit disposed on the second surface,
    wherein the first signal with the first frequency passes through the first resonator unit to generate a contactless coupling between the first resonator unit and second resonator unit, so that the first signal is transferred between the first resonator unit and second resonator unit in a manner of electromagnetic coupling transmission.

2. The integrated contactless signal transfer apparatus as claimed in claim 1, wherein the distance ranges between zero and 200 μm.

3. The integrated contactless signal transfer apparatus as claimed in claim 1, wherein the distance ranges between zero and 30 μm.

4. The integrated contactless signal transfer apparatus as claimed in claim 1, wherein each of the first resonator unit and the second resonator unit is a distributed element, a semi-distributed element, or a lumped element.

5. The integrated contactless signal transfer apparatus as claimed in claim 4, wherein the first resonator unit and the second resonator unit are each the distributed element.

6. The integrated contactless signal transfer apparatus as claimed in claim 1, wherein the chip includes a signal feed-in unit connected to the first resonator unit.

7. The integrated contactless signal transfer apparatus as claimed in claim 6, wherein the chip further includes a grounding unit held between the first resonator unit and the substrate.

8. The integrated contactless signal transfer apparatus as claimed in claim 1 wherein the substrate is a silicon substrate.

9. The integrated contactless signal transfer apparatus as claimed in claim 1, wherein the substrate is a GaAs substrate.

10. The integrated contactless signal transfer apparatus as claimed in claim 1, wherein the first signal has a first wavelength, the first resonator unit has a first resonant path, and the first resonant path has a length of about ¼, ½, or integer multiple of the first wavelength.

11. The integrated contactless signal transfer apparatus as claimed in claim 1, wherein the second resonator unit generates a second signal with a second wavelength, the first resonator unit has a second resonant path, and the second resonant path has a length of about ¼, ½, or integer multiple of the second wavelength.

12. The integrated contactless signal transfer apparatus as claimed in claim 1, wherein the second resonator unit has a U shape.

13. The integrated contactless signal transfer apparatus as claimed in claim 1, wherein the contactless coupling is a near-field coupling, and the near-field coupling is an inductive coupling, a capacitive coupling, or a mixed coupling.

14. The integrated contactless signal transfer apparatus as claimed in claim 1, wherein the second resonator unit comprises a plurality of resonators.

* * * * *